United States Patent
Wagner

(10) Patent No.: US 7,956,744 B2
(45) Date of Patent: Jun. 7, 2011

(54) DIGITAL ID TAG FOR LOST OR STOLEN ELECTRONICS DEVICES

(75) Inventor: Jason Wagner, Winnipeg (CA)

(73) Assignee: TrackItBack, Manitoba, Winnipeg (CA)

( * ) Notice: Subject to any disclaimer, the term of this patent is extended or adjusted under 35 U.S.C. 154(b) by 251 days.

(21) Appl. No.: 12/112,820

(22) Filed: Apr. 30, 2008

(65) Prior Publication Data

US 2009/0322530 A1    Dec. 31, 2009

(51) Int. Cl.
*G08B 13/14*    (2006.01)

(52) U.S. Cl. .................. 340/572.1; 340/5.31; 340/568.1; 705/1

(58) Field of Classification Search .............. 340/539.11–539.13, 568.1–573.1, 340/5.31; 235/735; 709/217; 705/1, 35; 707/100

See application file for complete search history.

(56) References Cited

U.S. PATENT DOCUMENTS

| | | | |
|---|---|---|---|
| 4,893,840 A | 1/1990 | Berkowitz | |
| 5,036,610 A | 8/1991 | Fehr | |
| 5,570,081 A | 10/1996 | Holstrom | |
| 5,878,116 A | 3/1999 | Scott | |
| 5,912,956 A | 6/1999 | Longo et al. | |
| 5,955,952 A | 9/1999 | Bergman et al. | |
| 5,987,609 A | 11/1999 | Hasebe | |
| 6,064,307 A | 5/2000 | Silver | |
| 6,087,937 A | 7/2000 | McCarthy | |
| 6,283,065 B1 | 9/2001 | Shorrock et al. | |
| 6,449,611 B1 | 9/2002 | Frankel et al. | |
| 6,546,088 B2 | 4/2003 | Campbell | |
| 6,684,087 B1* | 1/2004 | Yu et al. | 455/566 |
| 6,832,320 B1 | 12/2004 | Broyles, III et al. | |
| 7,107,349 B2 | 9/2006 | Britt, Jr. | |
| 7,172,117 B2 | 2/2007 | Moore | |
| 7,187,936 B2* | 3/2007 | Allyn et al. | 455/456.2 |
| 2001/0053981 A1 | 12/2001 | Wyssen | |
| 2002/0073314 A1 | 6/2002 | Bhat | |
| 2003/0074577 A1 | 4/2003 | Bean et al. | |
| 2003/0146977 A1* | 8/2003 | Vale et al. | 348/207.1 |

(Continued)

OTHER PUBLICATIONS

International Search Report and Written Opinion for International Application No. PCT/CA2008/002260, 14 pages.
http://web.archive.org/web/20061129151101/www.trackitback.com/sitepages/main/about-whatistib, TrackItBack.Com's website pages (4pp).

*Primary Examiner* — Brent Swarthout

(74) *Attorney, Agent, or Firm* — Nikolai & Mersereau, P.A.; Thomas J. Nikolai

(57) ABSTRACT

In some embodiments, a method of retrieving an electronics device may include one or more of the following steps: (a) accepting a purchase order for a DID from a user, (b) linking a tracking number to a tracking element to create the DID, (c) sending the DID to the electronics device, d) writing a jump copy to a database, (e) sending an instructional message to the user instructing the user how to place the DID on their electronics device, (f) saving the DID to the database, (g) requesting details regarding the electronics device, (h) storing the electronics device details in the database, (i) saving a user selected image to the database, (j) accessing available DID for use with the electronics device, (k) accessing dimensions of a display for the electronics device from the database, (l) downloading an image to a computer, and (m) transferring the image from the computer to the electronics device.

6 Claims, 3 Drawing Sheets

U.S. PATENT DOCUMENTS

2004/0049396 A1 3/2004 Hope
2005/0055282 A1 3/2005 Ackerman et al.
2006/0265298 A1 11/2006 Lee et al.
2006/0272034 A1* 11/2006 Bhansali et al. ................ 726/34
2008/0079581 A1 4/2008 Price
2009/0013060 A1 1/2009 St Marie

* cited by examiner

DIGITAL ID TAG FOR LOST OR STOLEN ELECTRONICS DEVICES

BACKGROUND OF THE INVENTION

I. Field of the Invention

Embodiments of the present invention relate to lost and found systems. Particularly, embodiments of the present invention relate to a system and method for identifying and recovering lost personal property. More particularly, embodiments of the present, invention relate to a method and system for use over a wide geographical area for a substantial variety of personal electronics devices.

II. Discussion of Related Art

A lost and found is a large public building or area where visitors can go to retrieve lost articles being found by other visitors. Frequently found at museums, amusement parks and schools, a lost and found will typically be a clearly-marked box or room in a location near the main entrance.

Some lost and found offices will try to contact the owners of any lost items if there are any personal identifiers available. Practically all will sell, give, or throw away items after a certain period has passed to clear their storage.

The first lost and found office was organized in Paris in 1805. Napoleon ordered his prefect of police to establish it as a central place "to collect all objects found in the streets of Paris", according to Jean-Michel Ingrandt, who was appointed the office's director in 2001. However, it was not until 1893 Louis Lepine, then prefect of police, organized efforts to actively track down the owners of lost items.

Lost and found offices at large organizations can handle a large and varied collection of articles. Transport for London's lost property offices (which handle items lost on the city's Tube, buses, and taxis) handles over 130,000 items a year; including 24,000 bags, and 10,000 mobile phones. Among the more peculiar items handed include a wedding dress, ashes in an urn, a longcase clock, a kitchen sink, and several wheelchairs.

Each year millions of people lose millions of personal and business items they wish they could have returned to them. Although someone usually finds many of these lost items, they are often not returned to their original owners for a variety of reasons. Such reasons include: the fact the items themselves are often not marked with information clearly identifying the owner, or how the item can be returned to the owner; there is usually ho clearly identifiable incentive for any finder to return the items; and there is no easy mechanism for a Finder to return the item to its original owner and redeem an incentive. Most people would wish to have any item they own returned to them in the event of a loss. One obvious reason for this is they do not want to go through the expense of having to replace the lost item. Even if they have sufficient insurance to cover the physical cost of goods, (which is not always the case), there is still the significant time, effort and inconvenience involved in having to find and shop for a replacement item, contact the insurance company and complete the insurance claims process, and hope to receive fair value from the insurers. In addition, many business and personal items have significant hidden value to their owners well in excess of the item's physical replacement value. For example, a laptop computer or personal organizer filled with data the owner forgot to "back-up" has a value to owner well in excess of its simple replacement value.

There are some existing systems providing a way for return of lost items. One such system used in England provides for the return of lost keys. The owner of the keys buys a policy from the key registry system and is given a tag with a number on it can be attached to the keys of the policyholder. When the keys are lost a person finding them returns them to a local police station. The police then inform the key registry system they have a set of lost keys; the key registry matches them with the number in their system of a policyholder of the key registry according to the matched number. The key registry then picks up the keys and returns them to the owner, instructs the police to whom to return the keys, or informs the policyholder where to reclaim their keys, and also pays the person who found the keys a small reward.

A number of other systems have been proposed for the return of lost property under certain circumstances. One such system provides for the placing of a tag on an item of personal property, which asks anyone finding the item to take it to a specific package delivery system. If the personal property is lost and then turned into the package delivery system the package delivery system can electronically read identifying information on the tag and thereby identify the owner and send it back to the owner. The owner then pays the fee required for its return. Another system provides a two-part tag an owner of personal property can purchase from a central registry. The owner puts one of the tags on the item of personal property and retains the other in a safe place for future reference. The portion of the tag on the personal property asks anyone finding it to call the central registry and leave a telephone message with the tag number who they are and how the owner can recover the lost item from the finder. The message left by the finder of the lost article is identified by the number on the tag the finder has been instructed to enter during the call. The owner of the lost item calls the central registry and inputs the identifying tag number and can pick up the call left by the finder of the lost item and from the information left make contact with the finder for return of the item.

A number of other systems exist providing for the return of lost personal property. However, all of these systems including those described above suffer from a number of deficiencies making them uneconomical and not suited for today's world. While some may provide for anonymity and all provide for a way of identifying the lost item none are adaptable to a cover a large area such as the entire United States or other large geographical areas. A person traveling on a long trip may take off in a plane from one airport and pass through several airports before reaching their final destination. If they lose an item on the trip they might not be able to place the exact spot he or she lost the item. Thus, if one loses a personal computer in the main airport in Atlanta while traveling from Philadelphia to Denver he or she will generally never see it again or when they do receive it, it will be after a long delay and the computer typically will be damaged, etc. Even if the item is identified there might not be any incentive, or any easy way for the finder to determine the value of the incentive, or easy means of returning it to the owner. Also there is no way for the owner to increase the incentive in quickly in order to increase the chance of a finder returning the item, and for the finder to quickly determine the increased incentive. All of the existing systems lack the ability to provide a quick and easy means for the owner and person finding the item to quickly make contact and easily return the item while providing the person finding the lost item with some type of assurance they will receive something for their effort. Additionally, none really provide a general-purpose asset registry handling a large variety of types of personal property.

Thus, what is needed is a system and method providing for the safe and expeditious return of lost personal property, especially lost or stolen electronics devices. A system allowing the owner of the personal property to remain anonymous to the finder of the lost item but still providing an incentive to return the lost item in the form of a reward paid to the finder of the lost item. Such a system should also provide for some way of assuring the return of the lost item in a relatively undamaged state. Additionally, such a system must be flexible and allow for user interaction and be capable of functioning effectively over an extremely large geographic area.

SUMMARY OF THE INVENTION

In some embodiments, an electronics device may include one or more of the following features: (a) a housing, (b) transceiver for transmitting and receiving communications, (c) a display to display received data, and (d) a DID received through the transceiver and displayed on the display.

In some embodiments, a method of retrieving an electronics device may include one or more of the following steps: (a) accepting a DID registration for the electronics device, (b) processing a report of the electronics device being lost or stolen, (c) receiving the electronics device from a finder, (d) returning the electronics device to a user, (e) rewarding the finder of the electronics device, (f) accepting a report of a lost electronics device from the user, and (g) accepting a report of a lost electronics device from the finder.

In some embodiments, a method of retrieving an electronics device may include one or more of the following steps: (a) accepting a purchase order for a DID from a user, (b) linking a tracking number to a tracking element to create the DID, (c) sending the DID to the electronics device, (d) writing a jump copy to a database, (e) sending an instructional message to the user instructing the user how to place the DID on their electronics device, (f) saving the DID to the database, (g) requesting details regarding the electronics device, (h) storing the electronics device details in the database, (i) saying a user selected image to the database, (j) accessing available DID for use with the electronics device, (k) accessing dimensions of a display for the electronics device from the database, (l) downloading an image to a computer, and (m) transferring the image from the computer to the electronics device.

DESCRIPTION OF PREFERRED EMBODIMENT

Figure 1:
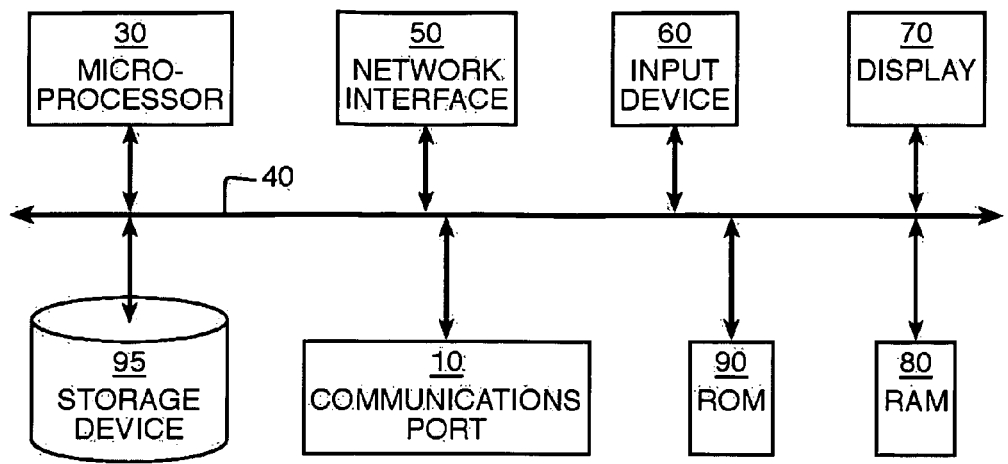
FIG. 1 shows a block diagram of the internal architecture of a computing device according to some embodiments of the invention.

The following discussion is presented to enable a person skilled in the art to make and use the present teachings. Various modifications to the illustrated embodiments will be readily apparent, to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

With more and more people relying on electronic devices, such as cell phones, Blackberrys™, laptops, iPods™, and digital cameras, embodiments of the present invention provide a simple, effective, low-cost way to recover lost or stolen electronics devices.

FIG. 1 is a representative block diagram of a computing device according to some embodiments. It is understood computing device 4 could be used to execute program 200 described below. Computing device 4 may comprise a single device or computer, a networked set or group of devices, or computers, such as a workstation, laptop, etc. Computing device 4 is typical of a data session-capable machine. Computing device 4 can include a microprocessor 30 in communication with communication bus 40. Microprocessor 30 is used to execute processor-executable process steps so as to control the components of computing device 4 to provide functionality according to embodiments of the present invention. Microprocessor 30 may comprise a Pentium™ or Itanium™ microprocessor manufactured by Intel™ Corporation. Other suitable processors may be available from Motorola™ Inc., AMD™, or Sun Microsystems™ Inc. Microprocessor 30 also may comprise one or more microprocessors, controllers, memories, caches and the like.

Input device 60 and display 70 are also in communication with communication bus 40. Any known input device may be used as input device 60, including a keyboard, mouse, touch pad, voice-recognition system, or any combination of these devices. Input device 60 may be used by a user to input information and commands and select a destination party (parties) to initiate instant messaging.

Display 70 may be an integral or separate CRT display, a flat-panel display, or the like. Display 70 is generally used to output graphics and text to an operator in response to commands issued by microprocessor 30.

RAM (Random Access Memory) 80 is connected to communication bus 40 to provide microprocessor 30 with fast data storage and retrieval. In this regard, processor-executable process steps being executed by microprocessor 30 are typically stored temporarily in RAM 80 and executed therefrom by microprocessor 30. ROM (Read-Only Memory) 90, in contrast, may provide storage from which data can be retrieved but to which data cannot be stored. Accordingly, ROM 90 may be used to store invariant process steps and other data, such as basic input/output instructions and data used during system boot-up or to control input device 60. One or both of RAM 80 and ROM 90 may communicate directly with microprocessor 30 instead of over communication bus 40, or on separate dedicated busses.

Data storage device 95 stores, among other data, processor-executable process steps of digital ID program 200. The process steps and program code of program 200 and the like may be read from a computer-readable medium, such as a floppy disk, a CD-ROM, a DVD-ROM, a Zip™ disk, a magnetic tape, or a signal encoding the process steps/program code, and then stored in data storage device 95 in a raw, compressed, uncompiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 50 which may be a wired or wireless Ethernet interface, a modem interface, and so on. In utilizing the various embodiments of the invention, network interface 50 may be connected to or provide access to a high-speed connection to the Internet or an Intranet provider giving access to the Internet or similar networks. Using such a network or networks, computing device 4 can communicate identifiers of destination parties to a mobile application server.

Stored in data storage device 95 may also be other elements necessary for operation of computing device 4, such as other applications, other data files, a network server, an operating system, a database management system and "device drivers" for allowing microprocessor 30 to interface with external devices. These elements are known to those skilled in the art and are therefore not described in detail herein.

Figure 2:
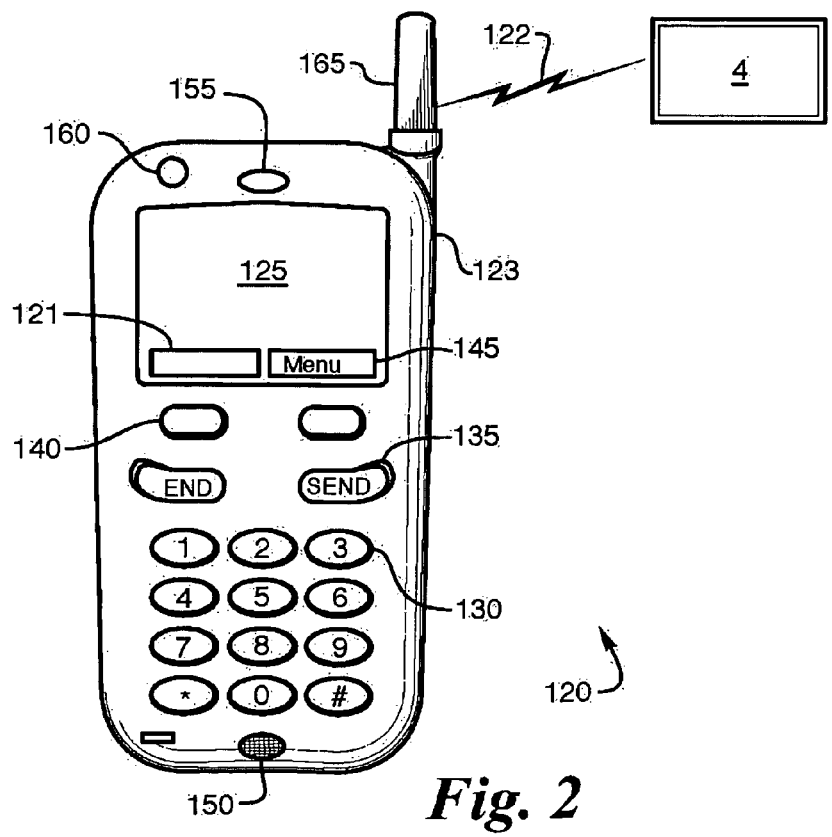
FIG. 2 is a front view of a personal electronics device according to some embodiments.

With reference to FIG. 2, a front view of a personal electronics device in embodiments of the present invention is shown. A personal electronics device may embody a mobile telephone 120 or a desktop computer, a laptop computer, a handheld computer, a PDA (personal data assistant), a digital medial player, a digital camera, a wireless email device, and any other device which can communicate within any type of communication protocol without departing from the spirit of the invention. Mobile telephone 120 may include conventional components, and may include program code for performing certain functions described herein.

Mobile telephone 120 may be compatible with one or more cellular communication protocols 122. Examples of such protocols include, but are not limited to, CDMA, Time Division Multiple Access (TDMA) (e.g., GSM, D-AMPS), Bluetooth, and CDMAOne (e.g., PCS). Embodiments are not limited to devices offering cellular and/or telephone functionality.

Mobile telephone 120 includes housing 123, display 125, keypad 130, fixed function keys 135, variable function keys 140, function key labels 145, microphone 150, speaker 155, power button 160, and antenna 165. Antenna 165 could be a receiver only or a transceiver (e.g., in accordance with IEEE 802.3) capable of being both a transmitter and a receiver which are combined and share common circuitry or a single housing. If no circuitry is common between transmit and receive functions, the device could be a transmitter-receiver. Antenna 165 could also be a transponder, transverter, and repeater without departing from the spirit of the invention. Display 125 may present a user interface for receiving commands and data from a user.

Figure 3:
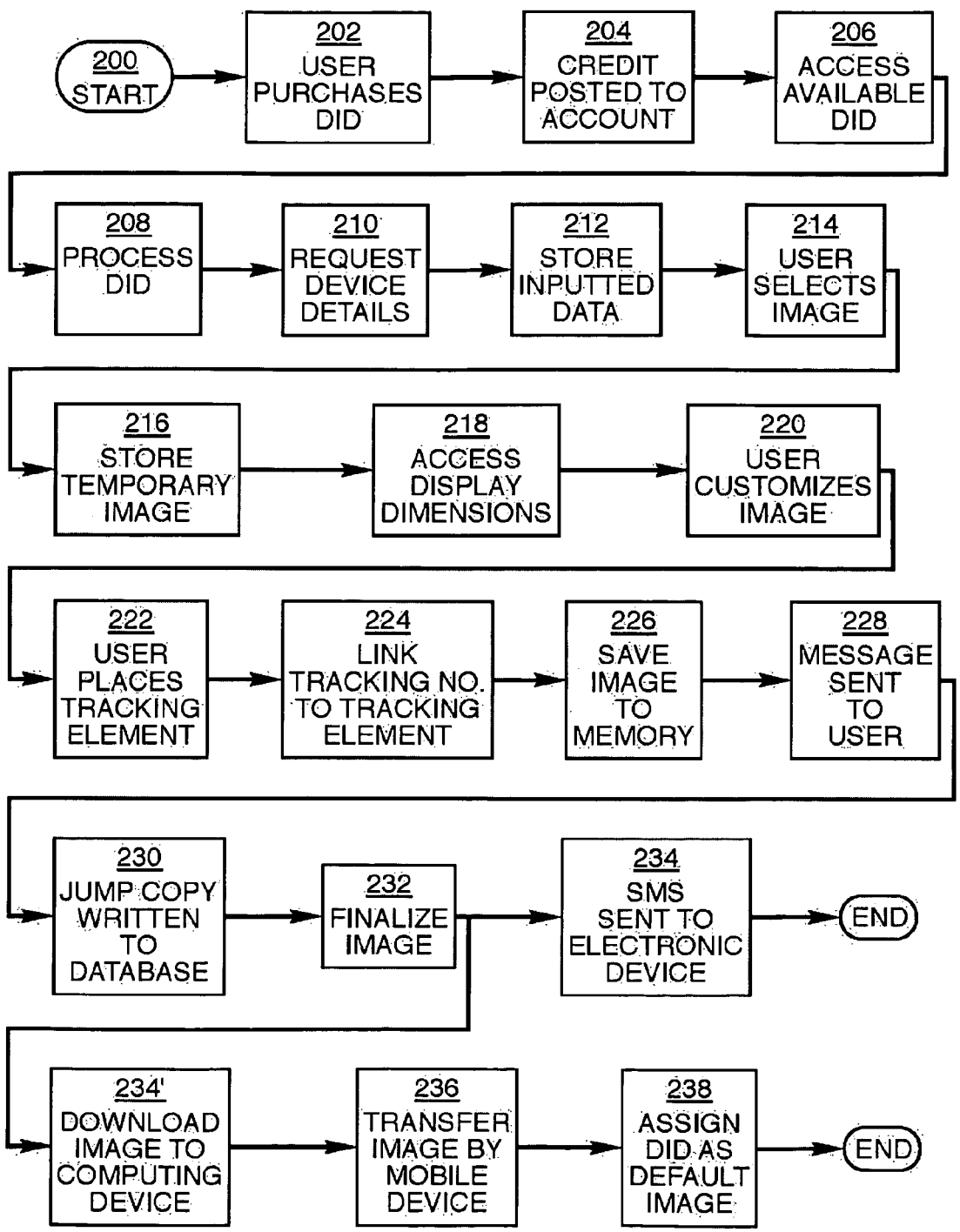
FIG. 3 is a flow chart diagram of a digital ID system in an embodiment of the present invention.

With reference to FIG. 3, a flow chart diagram of a digital ID system in an embodiment of the present invention is shown. At state 202 a system user can purchase a DID (digital ID) 121 for a personal electronics device they may own. When the user purchases a DID a credit is posted to their personal account at state 204. If the user has not set up an account, they may be prompted to do so. There is also the possibility a complimentary DID 121 has been credited to a user's account for a promotional reason. Regardless, a user is able to view how many DID 121 credits they may have when viewing their account.

If a user has one or more DID credits on their account, the user will have the option to activate a DID 121 for a personal electronics device such as mobile telephone 120. When a user chooses to activate a DID 121, system 200 begins by accessing a next available unassigned DID 121 from database 95 at state 206. At state 208, system 200 proceeds through ministerial steps such as adding the DID 121 to the users "Item List", registering a DID tracking number, logging a date of activation, logging ah expiration date for the DID 121, and changing the DID status to "active". System 200 then requests the user to input their electronics device information details at state 210. Device details may include, type of device (e.g., cell phone, I-pod™, or PSP™), manufacturer of device (e.g., Motorola™, Apple™, or Sony™), and preferred method of receiving DID 121 (e.g., Bluetooth™, email, or SMS).

System 200 stores all of the user's inputted data into storage device 95 at state 212. System 200 allows the user to select from a list of stock images or choose an image of their own which will be uploaded by cell phone 120 at state 214. At state 216, system 200 stores a temporary copy of the image. System 200 accesses the electronics device's screen dimensions (e.g., display 125) from database 95 at state 218. The image is then presented to the user in the display dimensions of the electronics device (e.g., the display 70 is grayed out except for an area equivalent to the electronic device screen size; display 125). The user is allowed to manipulate the image by dragging it around the highlighted area and thus selecting where the image will be presented on display 125 at state 220. At state 222, system 200 requests the user drag and drop a tracking digital element onto the image wherever they desire this element.

System 200 links the tracking number to the tracking element placed on the image at state 224. At state 226, system 200 writes the image and tracking element to storage device 95. An email, text, or SMS (Short Message Service) is sent from port 10 to the user explaining how to retrieve their image at state 228. System 200 can then write a "jump copy" of the image to database 95 at state 230. Jump copies are typically required for many mobile phones in order to receive the image. System 200 will display the final screen to the user showing a preview of their image, a link to the image location, a button to preview the image in a browser, and a button to request the image be SMS'd to the user at state 232.

If an SMS is requested by the user, system 200 sends an SMS through communications port 10 to cell phone 120 via the cell phone's number with a link to the actual image at state 234. It is contemplated the user can modify their chosen image as often as they want. It is also contemplated a user can potentially save hundreds of different images on their electronics device with the same unique tracking number without departing from the spirit of the invention.

If the electronics device is an Ipod™, a digital camera, or any other electronics device which does not transmit or receive information then the user can use an "Image Link" to download the image to a laptop or desktop computer at state 234'. The user can enter the link in the computer's web browser and then save it to disk. At state 236, the user can transfer the image to the electronics device. This could be done through a USB, Firewire, Serial or Bluetooth connection. Each device can have specific instructions for transferring the image. At step 238, the user can assign the label as the default image on the electronics device. It is noted, the iPod Touch™ and the iPhone™ both include WIFI networks which can retrieve their own images without a transfer from a computer.

Figure 4A:
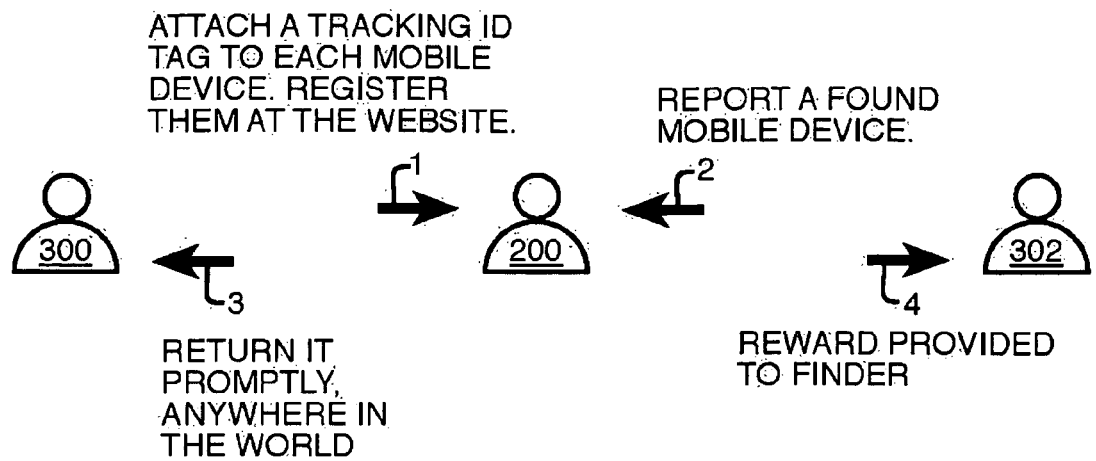
FIG. 4A is a block diagram showing the interaction between owner, system, and finder in an embodiment of the present invention.
Figure 4B:
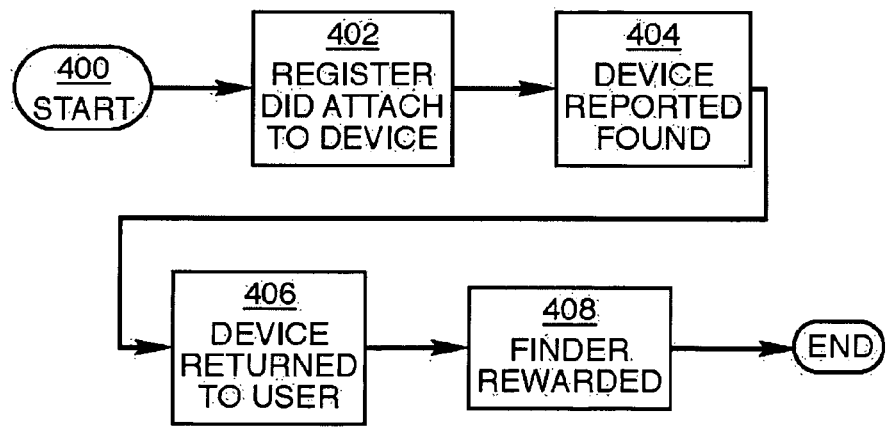
FIG. 4B is a flow chart diagram showing the process for locating and returning a lost or stolen electronics device in an embodiment of the present invention

With reference to FIGS. 4A and 4B, a block and flow diagram showing the interaction between owner, system, and finder in an embodiment of the present invention is shown. As discussed above, in process 400 user 300 attaches attacking ID tag to each electronics device they wish and registers these devices with system 200 at a website at state 402. If the electronics device is ever lost or stolen, user 300 can report the electronics device lost or stolen with system 200 through a webpage or by calling.

If the electronics device is found by finder 302, then finder 302 can report she/he has found the electronics device on a webpage at state 404. If finder 302 is in control of phone 120, then they would indicate the phone 120 has been found. After which, the DID 121 would display the necessary actions to be taken to report phone 120 as being found. System 200 can pick up the electronics device from finder 302 and return it to user 300 at state 406. Finder 302 can be offered a monetary reward and or a gift, such as a DID 121, at state 408.

Thus, embodiments of the DIGITAL ID TAG FOR LOST OR STOLEN ELECTRONICS DEVICES are disclosed. One skilled in the art will appreciate the present teachings can be practiced with embodiments other than those disclosed. The disclosed embodiments are presented for purposes of illustration and not limitation, and the present teachings are limited only by the following claims.

I claim:

1. An electronics device, comprising:
    a housing;
    a transceiver for transmitting and receiving communications;
    a display to display pre-stored images and received data, the received data being selectively movable relative to displayed pre-stored images; and
    the received data including a DID received through the transceiver and displayed on the display.

2. The electronics device of claim 1, wherein the DID displays a message when the electronics device is lost or stolen.

3. The electronics device of claim 2, wherein the display presents the DID and a digital picture image.

4. The electronics device of claim 3, wherein the picture can be selected by a user of the electronics device.

5. The electronics device of claim 4, wherein the DID can be sent to the electronics device through any one of the following protocols: CDMA, TDMA, GSM, D-AMPS, Bluetooth, or CDMAOne.

6. The electronics device of claim 5, wherein the electronics device can be any one of a cell phone, Blackberrys™, laptop computer, iPod™, digital camera, or PDA.

* * * * *